United States Patent [19]
Morgan

[11] 3,751,992
[45] Aug. 14, 1973

[54] CHROMATOGRAPHY VALVE
[75] Inventor: David A. Morgan, North Wales, Pa.
[73] Assignee: Honeywell Inc., Minneapolis, Minn.
[22] Filed: July 7, 1971
[21] Appl. No.: 160,463

[52] U.S. Cl.............................. 73/422 GC, 73/423 R
[51] Int. Cl. ............................................ G01n 1/10
[58] Field of Search .................. 73/422 R, 422 GC; 134/1; 259/DIG. 44; 239/102

[56] References Cited
UNITED STATES PATENTS
| | | | |
|---|---|---|---|
| 3,679,132 | 7/1972 | Vehe et al. | 239/102 X |
| 3,087,332 | 6/1961 | Kern | 73/147 |
| 3,064,481 | 11/1962 | Alexander | 72/423 R X |
| 3,105,779 | 10/1963 | Davenport | 134/1 |
| 3,217,543 | 11/1965 | Van Haagen | 73/359 X |
| 3,318,154 | 5/1967 | Rendina | 73/422 GC |

Primary Examiner—Richard C. Queisser
Assistant Examiner—Daniel M. Yasich
Attorney—Arthur H. Swanson et al.

[57] ABSTRACT

A sampling device for extracting a sample to be analyzed having a volume less than 0.01 microliter from a fluid stream by selectively introducing a slideably supported shaft into the fluid stream to expose a sample retaining capillary hole in the shaft to the fluid stream. An ultrasonic oscillator is positioned in the the fluid stream to add vibrational energy thereto to force a liquid sample into the capillary hole. The shaft is, subsequently, withdrawn from the fluid stream to deliver the fluid sample to a fluid analyzing means.

4 Claims, 1 Drawing Figure

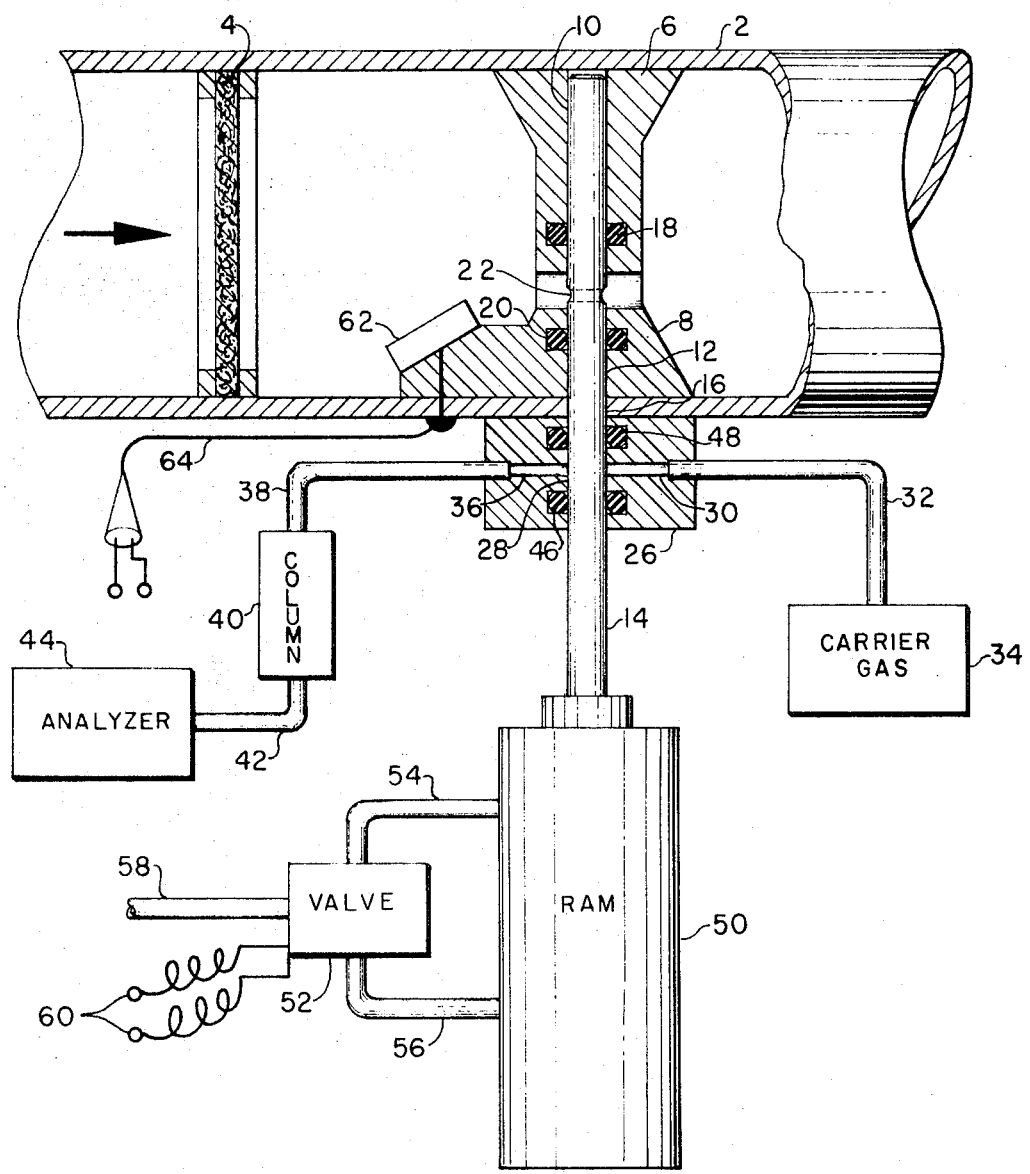

CHROMATOGRAPHY VALVE

BACKGROUND OF THE INVENTION

Chromatography is a method of separating closely related chemicals by taking advantages of differences in molecular size. One way to separate a particular chemical from a mixture of various chemicals is to filter the mixture through several filter papers of various pore sizes, running the mixture through the coarses filter first, then through successively finer filters. The chemical of interest will be deposited in relatively pure form on one particular filter. The method just described is not suitable for testing several successive samples for content of the various chemicals since the filters must be replaced or cleaned carefully after each sample. Thus, that technique is limited to laboratory use.

Another way to separate particles by physical size is to run a given mixture, in solution form, through a porous filter which will pass all chemicals included in the mixture. The large molecules will pass through the filter at a slower rate than the smaller molecules. Accordingly, by making the filter very thick, the time required for molecules to pass through the filter can be greatly increased. This also increases the differences between the characteristic times for the different sizes of molecules. For a given filter configuration, a chemical can now be identified by the characteristic time required to pass through the filter. This technique is applicable to industrial use where samples are taken at regular intervals by automated devices. Regular samples can be separated through this type of filter without cleaning. This type of filter generally takes the form of a piece of tubing packed with some inert material, such as diatomaceous earth, and wound into a coil called a column. It is a function of the automated analyzer to separate a mixture into its various constituent and identify them as to name and relative amounts. Since the column separates the various constituents, it remains for the analyzer to identify them. Accordingly, some property of the materials is checked, e.g., thermal conductivity. This is measured as the constituents come out of the column and is compared against known standards.

In a typical chromatographic analyzer, an inert carrier gas is continually pumped through at a constant flow rate. This inert gas, e.g., $Co_2$, is used for two purposes. First, it dissolves the samples and carries them to and through the column. Second, it acts as a reference material whose thermal conductivity is continually monitored. As the carrier gas passes through a first chamber, which is kept at an elevated temperatures, it cools a thermister within the chamber and increases the electrical resistance of the thermister. For a given flow rate of the carrier gas, equilibrium of the thermister resistance will quickly be established. The carrier gas next passes through a column and into a second chamber, identical to the first one. Again a thermistor is cooled, and its electrical resistance increases to an equilibrium value. These two thermistors are wired into a bridge circuit, and the circuit is balanced. The output of the bridge is zero at equilibrium and, thus, indicates the absence of foreign matter in the carrier gas. However, when a sample to be analyzed is injected into the carrier gas stream between the first chamber and the column the effects will be seen in the form of an unbalance signal from the bridge circuit. This output signal may be recorded on a strip chart recorder. Thus, the chemical can be identified by the characteristic time of column passage and the relative amount thereof mixed with the carrier gas by the relative areas under the recorded waveform. The recorded waveform appears when an area of high concentration of a particular substance passes the second thermistor and upsets the balance of the bridge. Generally, instead of using a recorder as an output, a digital computer may be employed to reduce the data quickly and give more accurate results.

There are, of course, obvious limitations to this approach to chromatographic analysis. Primary amoung them is the fact that no universal data is available to determine characteristic column passage time of particular chemicals. The times vary with the geometry of a column, the filter material, the temperature, the gas flow rate and other minor effects. Therefore, the analyzer device must be calibrated for each constituent that would possibly be tested, and the filter material must be selected accordingly. Another limitation, not so obvious at first, is the size of the sample that is taken. At present levels of analyzer technology, liquid samples can be taken down to about 1 microliter. Samples of this size require several minutes to separate in a column due to necessarily long column length. As the sample size is reduced, column length can, also, be reduced, and, thus, the time required to analyze the sample will be reduced. A reduction in liquid sample size from 1 microliter to 0.01 microliter would reduce the necessary time to analyze the sample from minutes to seconds. Accordingly, it would be desirable to produce a sampling device capable of extracting the samples from a sample stream in quantities that are no larger than 0.01 microliters. The advantage for the development of faster analyzers is self-evident in view of prior use in industrial process control. For example, a large chemical plant mixing several chemicals performs on either a continuous or on a batch basis. A central control computer collects data from various instruments such as pressure guages, flow meters, temperature sensors, and chromographic analyzers. The computer maintains these devices at preset levels by making continuous corrections at various valves, heaters, etc. The slowest instrument in the prior art systems is the chromographic analyzer. Thus, if a composition error occurs, it usually takes several minutes to find out about it, and, thus, a large amount of the end product of the chemical plant could be ruined during the occurrence of the error period. Thus, for a truly effective control system, the analyzer should function in approximately the same time as the other process sensing instruments.

Accordingly, an object of the present invention is to provide an improved sampling device for chromographic analyzers.

Another object of the present invention is to provide an improved sampling device capable of collecting samples having a volume less than 0.01 microliter.

A further object of the present invention is to provide an improved sampling device for extracting a sample having a volume less than 0.01 microliter from a sample stream and supplying the sample to a chromographic analyzers.

SUMMARY OF THE INVENTION

A sampling device including a sample storage means slideably supported in fluid-tight means for introducing sample storage means into a fluid stream to be sampled.

The sample storage means is provided with a sample retaining volume of less than 0.01 microliter which is exposed to the fluid stream when the storage means is introduced therein. An ultrasonic oscillator is arranged to add ultrasonic mechanical energy to the fluid stream to force a fluid into the sample retaining volume. The sample storage means is, subsequently, withdrawn from the sample stream and the captured sample is extracted from sample retaining volume for delivery to an analyzer.

BRIEF DESCRIPTION OF THE DRAWINGS

A better understanding of the present invention may be had when the following detailed description is read in connection with the accompanying drawings in which the single FIGURE is a pictorial diagram of a sampling device embodying the present invention.

DETAILED DESCRIPTION

Referring to the single FIGURE drawing in more detail, there is shown a pipeline 2 containing a fluid to be analyzed flowing in the direction indicated by the arrow. A filter means 4 is positioned in the pipeline 2 to filter the fluid before a fluid sample is extracted therefrom. Downstream from the filter 4, a pair of spaced-apart support means 6 and 8 are attached to respective and opposite sides of the inside wall of the pipeline 2. The first support member 6 has a hole 10 passing therethrough from an end of the member 6 extending into the fluid stream within the pipe 2 to inside wall of the pipe 2. The second support member 8 has a similar hole 12 passing therethrough and concentric with the hole 10 in the first support member 6. A shaft 14 is slideablely positioned in the holes 10 and 12 across the gap between the support members 6 and 8. One end of the shaft 14 extends through a hole 16 in the wall of the pipeline 2 beneath the second support member 8. The first support member 6 is provided with a shaft sealing means, e.g., an O-ring 18, surrounding the shaft 14 to provide a fluid-tight seal while the second support means 8 is arranged to contain a similar sealing means, e.g., a second O-ring 20, surrounding the shaft 14. The shaft 14 is provided with a sampling hole 22 located in the fluid stream passing between the members 6 and 8 in an elevated position of the shaft 14.

The end of the shaft 14 passing through the hole 16 in the pipe 2 is extended through a sample extracting station shown as sample extracting block 26. The extracting block 26 has a hole 28 passing therethrough concentric with the aforesaid holes 10, 12, and 16 and sized to slideably support the shaft 14. The sample extracting block 26 is provided with a first internal fluid passage 30 connecting with the hole 28 and connected by an external pipeline 32 to a source of a carrier gas 34. A second internal fluid passage 36 concentric with the first fluid passage 30 and connecting with the hole 28 on the opposite side from the first fluid passage 30 is connected by a second pipeline 38 to one end of a chromatographic column 40. The other end of the column 40 is connected by a pipeline 42 to a chromatographic analyzer 44. Inasmuch as the column 40 and the analyzer 44 are well-known in the art, further details thereof are omitted herein. The sample extracting block 26 is provided with a pair of fluid seals 46 and 48 located around the shaft 14 on respective sides of the fluid passages 30 and 36.

An end of the shaft 14 extending out of the sample extracting means 26 is connected to a suitable shaft moving means such as a ram 50. The ram 50 is a well-known fluid-operated device arranged to move the attached shaft 14 between a first and a second position by fluid pressure alternately applied to opposite ends of the ram 50 by a diverting valve means 52. Specifically, a first outlet of the valve means 52 is connected by a first fluid pipeline 54 to one end of the ram 50, and a second outlet of the valve 52 is connected by a second fluid pipeline 56 to the other end of the ram 50. A source of fluid pressure (not shown) is connected to an inlet of the valve means 52 by a third fluid pipeline 58 to apply a fluid pressure therethrough for operating the ram 50. The valve 52 may be an electrically operated valve energized by an electrical signal applied to a pair of electrical input terminals 60. An ultrasonic transducer means 62 is supported on the second support means 8 within the pipe line 2. The ultrasonic transducer means is energized from a source of electrical power (not shown) connected thereto by an electrical cable 64 passing through the wall of the pipeline 2.

In operation, the sampling valve of the present invention is actuated by the diverting valve 52 for alternately applying fluid pressure from pipeline 58 to opposite ends of the ram 50 to shuttle the shaft 14 between an extended position and a retracted position. In the extended position of the shaft 14, the hole 22 in the shaft 14 is exposed to the fluid stream in the pipeline 2. In the retracted position of the shaft 14, the hole 22 is aligned with the fluid passages 30 and 36 in the sample extracting means 26. In the retracted position, therefore, the source of carrier gas 34 is able to force the fluid sample from the hole 22 into the fluid passage 36 and fluid pipeline 38 to the chromatographic column 40.

If the diameter of the shaft 14 is one millimeter, the hole 22 is arranged to have a diameter of one-tenth of a millimeter with a resulting internal volume of 0.00785 microliters. Thus, the sample contained within the hole 22 will have a volume of substantially less than 0.01 microliters. Such a hole can be produced by the use of either a laser or an electrical discharge machine in a stainless steel shaft used for the shaft 14.

The fluid flowing in the pipeline 2 will not enter such a small opening without assistance due to surface tension forces in the fluid. The dynamic pressure of the fluid stream will, of course, push on the interface between the fluid in the stream and the gas contained within the capillary hole 22. This dynamic pressure is a function of the velocity and density of the sample stream and while at some velocity the sample stream might break through and enter the capillary hole 22, such a velocity is generally not available. For the following discussion, it is assumed that the sample stream is water at a temperature of approximately 100°F which is a typical fluid of interest to the process control industry especially since other important fluids such as gasoline are less viscous and present fewer problems than water. Accordingly, the ability of the sampling valve of the present invention to effect a sampling of a water stream will demonstrate an adaptability for other process industry fluids. It is further assumed that there is always sum velocity in the samples moving through the pipe 2. In order to arrive at a typical power output for the transducer 62, the following analysis is applicable: The opening into the capillary hole 22 is treated as a two dimensional circle in order to neglect the curvature of the shaft 14. The bubble interface at the entrance to the hole 22 assumes a spherical shape with maximum penetration into the capillary 22 equal to the radius of the capillary 22. When the inside wall of the capillary 22 is touched by this bubble, capillary forces will help draw the fluid sample into the capillary hole 22 with the assistance of the energy from the fluid stream in the pipe 2. Once the inside wall of the capillary hole 22 is wetted by the fluid, the free stream dynamic pressure will drive the fluid through the hole 22. However, the free stream velocity usually encountered in such process flow lines will generally not be sufficient to deflect the aforesaid bubble to an adequate depth within the hole 22 to produce a wetting of the wall of the hole 22, therefore the bubble, i.e., fluid-gas interface, must be broken by the addition of supplementary energy thereto.

The ultrasonic transducer 62 is arranged to add ultrasonic mechanical energy to the velocity energy of the fluid in the pipe 2 whereby the bubble can be broken to allow the sample fluid to pass into the capillary hole 22. The following analysis is a derivation of a suitable power output from the transducer 62 for the hole side previously discussed. When the sampling shaft 14 is introduced into the stream of the sample fluid between the support members 6 and 8, the capillary hole 22 is filled with carrier gas from the previous sampling operation. Since the capillary hole 22 is arranged to be parallel to the direction of flow of the fluid in the pipe 2, the dynamic pressure of the sample stream will tend to push the carrier gas into the hole 22 forming the aforesaid bubble at the entrance to the capillary hole 22. The average kinetic energy of the vibrating bubble can be expressed as $$E_V = \frac{1}{2} M \bar{X}2 \quad (1)$$

where $\dot{X} = WX \cos Wt$ = velocity.

It will be assumed that when the average kinetic energy $E_V$ is approximately ten times as great as the maximum energy that can be stored in the bubble surface the bubble will be broken. This will allow the liquid sample to pass into the capillary hole 22. The energy stored in the bubble can be determined as follows:

$$E\sigma = \sigma S \quad (2)$$

where $\sigma$ (surface tension) equals $4.85 \times 10^{-3}$ lbs/ft as a property of water and S equals $2\pi r^2$. Solving for $E\sigma$, we derive $8 \times 10^{-10}$ lbs/ft.

Using the aforesaid equation for the average kinetic energy of the vibrating bubble and an amplitude of vibration of 0.003 of an inch, equation (2) can be solved for ten times the average kinetic energy to obtain a frequency of vibration of approximately 153,000Hz. In order to utilize a practical power output for the ultrasonic transducer 62, it is necessary to pick a frequency that corresponds to the natural frequency of the bubble at the entrance to the capillary hole 22. In this way, the ultrasonic power output of the transducer 62 can be greatly reduced because the vibration energy can be built up over thousands of cycles which will eliminate any possibility of introducing an ultrasonic energy level which could cause vaporization of the liquid in the pipe 2. To find a natural frequency of the bubble, it will be treated as a vibrating thin membrane wherein the spring constant of the membrane can be expressed as $$K = F/y \quad (3)$$

From "Kents Mechanical Engineer's Handbood, Design and Production Volume" Colin Carmichael, published by John Wiley and Sons, Inc. in 1967 and referred to pages 8 to 33, the deflection of a thin membrane can be expressed as $$Y = [3F(m-1) 5(m+1) r^2]/(16\pi E m\ 2t3) \quad (4)$$

Solving the aforesaid spring constant equation (3) the result of 4.04 times $10^{-2}$ lb/ft is obtained. The natural frequency of the membrane is then expressed as $$f = K/M \quad (5)$$

and this yields an approximate frequency of 269,000Hz. Since many cycles will be allowed to build up the energy of vibration, the time lapse used can be 0.2 seconds, ($\Delta t = 0.2$) and using the equation of $P = 10E\sigma/\frac{1}{2} T$ (6)

where T = period yields $5.42 \times 10^{-8}$ watts

Distributing this energy over the bubble surface by $I = P/A$ with the area of the bubble being approximately $2.275 \times 10^{-6}$ cm² yields 0.0238 watts/cm².

In actual practice, the ultrasonic transducer 62 is not placed directly in front of the capillary hole 22 to minimzie disruption of the flow path of the liquid in the pipe 2. Assuming that the transducer 62 is placed 30° off the center line of the capillary hole 22, the actual need intensity will be 0.0275 watts/cm². If it is assumed that the transducer 62 delivers a power of 4.4 watts/cm² and only one percent of the ultrasonic energy reaches the bubble through the liquid in the pipe 2, the available power intensity at the bubble then becomes 0.044 watts/cm² which is more than the calculated power of 0.0275 watts/cm² required to perform the desired breaking of the bubble surface. As previously discussed, after the interface of the bubble touches the inside wall of the capillary hole 22, the liquid sample will be drawn into the capillary hole 22 by the combination of capillary attraction and the dynamic pressure of the fluid stream. The time required to fill the capillary hole 22 will be dependent on the capillary velocity of the fluid which may be obtained according to well-known methods. The speed of moving the shaft 14 between its extended and retracted positions is, accordingly, determined by the time of filling the capillary hole 22.

Accordingly, it may be seen that there has been provided, in accordance with the present invention, a sampling valve for chromatographic analyzers capable of collecting samples having a volume less than 0.01 microliters.

The embodiments of the invention in which an exclusive property of privilege is claimed are defined as follows:

1. A sampling valve comprising sample storage means having a sample storage volume of less than 0.01 microliters, means for introducing said sample storage means into a fluid stream to be analyzed, said means for introducing said sample storage means including means for slideably supporting said sample storage means and means for moving said sample storage means between a first and a second position, means for removing a sample from said sample storage volume when said sample storage means is in said second position, said means for removing a sample from said sample storage volume including a source of a carrier fluid connected to said means for slideably supporting said storage means and arranged to introduce a carrier fluid into said sample storage volume when said sample storage means is in said second position, and means for adding vibrational energy to the fluid to be analyzed to force said fluid into said sample storage volume.

2. A sampling valve as set forth in claim 1 wherein said means for adding vibrational energy is an ultrasonic transducer.

3. A sampling valve as set forth in claim 1 wherein aid means for introducing said sample storage means includes fluid sealing means arranged to isolate said sample storage volume between said first and second position of said sample storage means.

4. A sampling valve as set forth in claim 1 wherein said means for moving said sample storage means includes a fluid operating ram means and a selectively operable valve means connected to said ram means for selectively introducing an energizing fluid into said ram means.

* * * * *